United States Patent
Beier et al.

(10) Patent No.: US 11,187,881 B2
(45) Date of Patent: Nov. 30, 2021

(54) METHOD AND DEVICE FOR PRODUCING AN OPTICAL COMPONENT HAVING AT LEAST THREE MONOLITHICALLY ARRANGED OPTICAL FUNCTIONAL SURFACES AND OPTICAL COMPONENT

(71) Applicants: Fraunhofer-Gesellschaft zur Förderung der angewandten Forschung e.V., Munich (DE); Friedrich-Schiller-Universität Jena, Jena (DE)

(72) Inventors: Matthias Beier, Weimar (DE); Johannes Hartung, Jena (DE); Christoph Damm, Jena (DE); Stefan Risse, Jena (DE); Britta Satzer, Jena (DE)

(73) Assignees: Fraunhofer-Gesellschaft zur Förderung der angewandten Forschung e.V., Munich (DE); Friedrich-Schiller-Universität Jena, Jena (DE)

( * ) Notice: Subject to any disclaimer, the term of this patent is extended or adjusted under 35 U.S.C. 154(b) by 524 days.

(21) Appl. No.: 15/779,801

(22) PCT Filed: Nov. 29, 2016

(86) PCT No.: PCT/EP2016/079116
§ 371 (c)(1),
(2) Date: May 29, 2018

(87) PCT Pub. No.: WO2017/093242
PCT Pub. Date: Jun. 8, 2017

(65) Prior Publication Data
US 2019/0204571 A1 Jul. 4, 2019

(30) Foreign Application Priority Data

Dec. 1, 2015 (DE) ..................... 10 2015 120 853.9

(51) Int. Cl.
| | | |
|---|---|---|
| G02B 17/06 | (2006.01) | |
| B29D 11/00 | (2006.01) | |
| G02B 17/08 | (2006.01) | |

(52) U.S. Cl.
CPC .... *G02B 17/0647* (2013.01); *B29D 11/00596* (2013.01); *B29D 11/00932* (2013.01); *G02B 17/086* (2013.01)

(58) Field of Classification Search
CPC ........ B29D 11/00596; B29D 11/00932; B29D 11/00951; G02B 7/182; G02B 17/0626; G02B 17/0647; G02B 17/086; Y10T 82/10
See application file for complete search history.

(56) References Cited

U.S. PATENT DOCUMENTS

| | | | | |
|---|---|---|---|---|
| 4,333,368 A | * | 6/1982 | Watt ..................... | B24B 13/046 82/1.11 |
| 5,152,060 A | * | 10/1992 | Schubert ............... | F28D 9/0037 29/890.039 |

(Continued)

FOREIGN PATENT DOCUMENTS

| | | |
|---|---|---|
| DE | 102009041501 B | 9/2011 |
| EP | 0440578 A | 8/1991 |

(Continued)

OTHER PUBLICATIONS

JP 11174331A, 1999, English Machine Translation (Year: 1999).*

(Continued)

*Primary Examiner* — Sara Addisu
(74) *Attorney, Agent, or Firm* — Slater Matsil, LLP (57) ABSTRACT

A method and a device for producing an optical component having at least three monolithically arranged optical functional surfaces and an optical component are disclosed. The method includes calculating a continuous surface composite, which includes the first optical functional surface and the (Continued)

second optical functional surface, producing the continuous surface composite, which contains the first and second optical functional surfaces in a defined shape and a relative position to one another, on the first side of the optical component through machining by a machine tool, producing at least one reference surface arranged outside the optical functional surfaces on the optical component or on a mount and having a defined positional relation to the optical functional surfaces through machining by the machine tool and repositioning the optical component in such a way that the second side of the optical component is machined with the machine tool, wherein the at least one reference surface serves as a contact surface or mounting surface.

16 Claims, 4 Drawing Sheets (56) References Cited

U.S. PATENT DOCUMENTS

| | | | |
|---|---|---|---|
| 5,862,726 A | 1/1999 | Chan et al. | |
| 6,210,785 B1* | 4/2001 | Weber | G02B 6/0056 428/212 |
| 6,590,709 B1* | 7/2003 | Ori | B29D 11/00269 359/15 |
| 7,209,285 B1 | 4/2007 | Vanstone et al. | |
| 8,638,473 B2* | 1/2014 | Shimomura | B29D 11/00971 358/1.9 |
| 9,296,161 B2 | 3/2016 | Scheiding et al. | |
| 2002/0129682 A1* | 9/2002 | Muller | B23Q 17/22 82/1.11 |
| 2003/0058555 A1* | 3/2003 | Takino | G02B 7/182 359/850 |
| 2004/0134318 A1* | 7/2004 | Inada | B23Q 1/017 82/149 |
| 2004/0250665 A1* | 12/2004 | Miyazawa | B24B 13/06 82/1.11 |
| 2005/0107002 A1* | 5/2005 | Gottschald | B24B 41/04 451/8 |
| 2006/0223686 A1* | 10/2006 | Wakazono | B23Q 1/5462 483/1 |
| 2006/0260448 A1* | 11/2006 | Fiedler | B24B 27/0076 82/1.11 |
| 2007/0095175 A1* | 5/2007 | Ostendarp | B23Q 1/34 82/1.11 |
| 2007/0247589 A1* | 10/2007 | Schorcht | B24B 13/023 351/178 |
| 2010/0177320 A1* | 7/2010 | Arnold | G01B 11/2441 356/512 |
| 2010/0188856 A1 | 7/2010 | Ford et al. | |
| 2011/0080666 A1* | 4/2011 | Odhner | G02B 5/09 359/839 |
| 2015/0040368 A1* | 2/2015 | Quenzer | G02B 26/0841 29/428 |
| 2018/0243839 A1* | 8/2018 | Wielandts | B23B 31/307 |
| 2019/0375135 A1* | 12/2019 | Lu | B29D 11/00932 |

FOREIGN PATENT DOCUMENTS

| | | |
|---|---|---|
| EP | 0845692 A2 | 6/1998 |
| EP | 1618424 B1 | 8/2007 |
| JP | H11174331 A | 7/1999 |
| WO | 2012045177 A1 | 4/2012 |

OTHER PUBLICATIONS

Beir, M. et al., "Development, Fabrication, and Testing of an Anamorphic Imaging Snap-Together Freeform Telescope," Applied Optics, vol. 54, No. 12, Apr. 20, 2015, 13 pages.

* cited by examiner

METHOD AND DEVICE FOR PRODUCING AN OPTICAL COMPONENT HAVING AT LEAST THREE MONOLITHICALLY ARRANGED OPTICAL FUNCTIONAL SURFACES AND OPTICAL COMPONENT

CROSS-REFERENCE TO RELATED APPLICATIONS

This patent application is a national phase filing under section 371 of PCT/EP2016/079116, filed Nov. 29, 2016, which claims the priority of German patent application 10 2015 120 853.9, filed Dec. 1, 2015, each of which is incorporated herein by reference in its entirety.

TECHNICAL FIELD

The invention relates to a method for producing an optical component having at least three monolithically arranged optical functional surfaces, an optical component which can be produced by means of the method, and a device which is suitable to perform the method.

BACKGROUND

A method for producing an optical arrangement having at least two optical functional surfaces on a common carrier body is described in patent document DE 10 2009 041 501 B3. The method is particularly suitable to produce two optical functional surfaces, which are produced in one common production step or in successive production steps without de-clamping the component from the machine tool. This method is particularly suitable to produce reflective optical mirror surfaces.

However, it is necessary to arrange and produce optical functional surfaces on multiple side surfaces of a base body, in particular for optical devices that operate in a transmissive manner. These surfaces can have either refractive, reflective properties, or through the application of a micro-structure, also diffractive optical properties. For certain optical elements and devices, it may further be of advantage to integrate multiple functionalities in one single optical component, so that, for example, one single side of a common carrier body is divided into multiple optically-effective sub-regions each having different geometrical basic shapes. Optical components that have such surface arrangements on at least two different sides of the optical component are of particular interest here, since that way, some surfaces may function as refractive elements, and others may function as reflective optical elements.

SUMMARY

Embodiments of the present invention provide a method and a device by means of which an optical component having at least three optical functional surfaces monolithically arranged on two different sides of the optical component, which in particular are not rotationally-symmetrical to a common axis, but have a fixed positional relation to one another, can be produced with as much precision as possible, as little effort as possible and as short a machining time as possible.

According to at least one embodiment of the method, an optical component is produced, which comprises at least three monolithically arranged optical functional surfaces. "Monolithically arranged" particularly means that the optical functional surfaces are inseparably arranged in a fixed positional relation to one another. The optical component particularly forms a common basic body for the at least three optical functional surfaces. In the method, the optical functional surfaces are particularly produced in that surfaces of the base body of the optical component are machined by a machine tool in order to form the optical functional surfaces in the desired shape and position and in the required optical quality on the base body. In particular, the method allows producing optical functional surfaces on the optical component which are not rotationally-symmetrical to a common reference axis.

The optical functional surfaces may include a first optical functional surface and a second optical functional surface on a first side of the optical component, and at least one further optical functional surface on a second side of the optical component. The first side and the second side of the optical component can, in particular, be located opposite one another. At least two optical functional surfaces are generated on a first side surface of a base body of the optical component, and one or multiple further optical functional surfaces are generated on an opposite second side surface of the base body, for example. The base body of the optical component is preferably transparent to the electromagnetic radiation to be used for the optical component.

The method advantageously may include the calculation of a continuous surface composite, which includes the first optical functional surface and the second optical functional surface. In other words, a contiguous surface composite is calculated, which includes the optical functional surfaces arranged on the first side of the optical component. In the regions of the first and second optical functional surfaces, the calculated surface composite has the desired shape of the optical functional surfaces, in particular their height information, in a suitable coordinate system. Furthermore, the calculated surface composite may contain at least one intermediate region, which is calculated by interpolation of the optical functional surfaces beyond their edges. The calculation of the surface composite may include at least one calculation step in advance, in which the optical functional surfaces, the height profile of which may respectively first only be present in a local coordinate system, are transformed into a machining coordinate system suitable for the machining method. The machining coordinate system can, in particular, serve as a coordinate system for the production of all optical functional surfaces of the optical component.

According to at least one embodiment of the method, the continuous surface composite is produced on the first side of the optical component through a machining by means of a machine tool. That way, advantageously, the first optical functional surface and the second optical functional surface are generated in the same machining step in a defined shape and in a defined relative position to one another. One advantage of the production of the first and second optical functional surfaces in the surface composite consists in that the position of the optical functional surfaces relative to one another can be produced with an accuracy in the range of the production accuracy of one individual optical surface.

According to at least one embodiment of the method, in a further method step, at least one reference surface or preferably multiple reference surfaces are generated outside the optical functional surfaces and/or on a mount of the optical component by a machining with the machine tool. Advantageously, the at least one reference surface has a defined positional relation to the optical functional surfaces and is produced in particular by the machine tool in the same machining coordinate system as is used for the production of the optical functional surfaces.

Advantageously, in a further method step, the optical component is re-positioned in such a way that the second side of the optical component can be machined with the machine tool. Advantageously, in the repositioning, the at least one reference surface serves as a mounting surface or contact surface. In particular, in the repositioning, the optical component is arranged on a mount of the machine tool in such a way that it rests against the mount and/or is mounted thereto with the at least one reference surface. In this way, the optical component is arranged advantageously precisely in a defined position on the machine tool. In the repositioning, the optical component is arranged on the machine tool in particular in such a way that the second side faces a turning, milling or planing tool of the machine tool. In a possible configuration, the repositioning may include a re-clamping of the optical component, wherein the optical component is released from a mount and re-connected to the mount in a different position, for example turned by 180°. However, it is also possible that the optical component remains connected to the mount in the repositioning, wherein the at least one reference surface rests against the mount.

The repositioning of the optical component particularly occurs in such a way that the at least one further optical functional surface can be machined in the same machining coordinate system as the first and second optical functional surface. The optical component is repositioned particularly such that it is located in an exactly defined and known position in the machining coordinate system after the repositioning. This is particularly achieved in that in the repositioning, the optical component is received on the at least one, previously produced, reference surface, which has a defined positional relation to the first and second optical functional surface, for example in a mount of the machine tool. The at least one reference surface or preferably the multiple reference surfaces thus function advantageously as at least one contact or mounting surface(s) in the repositioning of the optical component. The optical component can be positioned highly accurately in the machining coordinate system by means of this at least one contact or mounting surface.

According to at least one embodiment of the method, in a further method step, the at least one further optical functional surface is produced on the second side of the optical component through a machining with the machine tool. Here, it is advantageous that the optical component is located in an exactly defined position in the machining coordinate system after the repositioning. In this way, it becomes possible, in particular, to produce the at least one further optical functional surface in a defined position relative to the first and second optical functional surfaces. In other words, the repositioning of the optical component using the at least one reference surface is decisive for the quality of the positional allocation between the optical functional surfaces on the first side of the optical component and the at least one further optical functional surface on the second side of the optical component. The at least one or advantageously multiple reference surfaces are thus preferably produced in optical quality as the optical functional surfaces, for example by a micro-machining process such as an ultra-precise diamond machining technique.

According to at least one embodiment of the method, in a further step, the shape and position of the at least three monolithically arranged optical functional surfaces is measured, wherein information about the deviation of the optical functional surfaces from their desired shape and position is obtained. A tactile and/or optical measuring device can be used to that end.

Subsequently, the steps of machining the first and second optical functional surface, the repositioning of the optical component and the machining of the at least one further optical functional surface may be repeated at least once, wherein the information about the deviation of the optical functional surfaces from their desired shape and position is used to perform a corrective machining of the optical functional surfaces in order to reduce the determined deviation with the machine tool.

In various embodiments the method described here allows to produce an optical component having at least three monolithically arranged optical functional surfaces, wherein the optical functional surfaces are located on at least two different sides of the optical component, and wherein the at least three optical functional surfaces are produced in an exactly defined position with respect to one another. The method is thus particularly suitable for complex optics with small aperture size, for example in the technological fields of automotive or sensor technology. However, the application of the method is not limited to small aperture sizes, and in fact, arrangements of optical functional surfaces with large apertures and special imaging properties can be produced with the method as well.

The steps of measuring the shape and position of the optical functional surfaces as well as the steps of the subsequent corrective machining can possibly be repeated multiple times until the deviation of the optical functional surfaces from their desired shape and position falls below a predetermined tolerance.

It can be provided in the method to produce multiple similar optical components. In this case, the corrective machining can be performed on a first optical component in order to produce a plurality of similar optical components by means of the method once the deviations determined by measurement techniques fell below the predetermined desired values, wherein a falling below the deviations determined by measurement techniques from the predetermined desired values can be ensured for all optical functional surfaces on all similar optical components by the reproducibility of the method, so that further iterative corrective machining on the similar optical components is not necessary.

In the method, the machining of the optical functional surfaces and/or of the at least one reference surface in the production and/or the corrective machining preferably occurs through a material-removing process, in particular by a micro-machining process. The material removing process can include a turning, milling, planing, grinding, or polishing process or a combination of multiple of these processes, for example.

According to at least one embodiment of the method, the machine tool comprises a turning tool, which preferably comprises a diamond as a cutting element. In this case, the machining of the optical functional surfaces and/or the at least one reference surface in the production and/or corrective machining can be performed at least partially by the turning tool of the machine tool.

Alternatively or additionally, the machine tool may comprise a milling tool or a planing tool, so that the production and/or corrective machining of the optical functional surfaces or of the at least one reference surface can at least partially be effected by the milling or planing tool. The milling tool or planing tool preferably comprises a diamond as a cutting element. The machining of the optical functional surfaces and/or of the at least one reference surface can also be effected by a successive or alternating use of a turning, milling and/or planing tool of the machine tool.

In the production and/or corrective machining with the machine tool, the machining of the optical functional surfaces and/or of the at least one reference surface can additionally or alternatively include a grinding or polishing process, or another material-removing process contacting or not-contacting the optical component.

According to at least one configuration of the method, at least two of the optical functional surfaces are formed as transmissive optical surfaces. The transmissive optical surfaces can be formed, in the method, in particular at an at least partially transparent base body of the optical component. The transmissive, optical functional surfaces can, in particular, have a refractive effect and be formed as lenses, for example.

In another advantageous configuration, at least one of the optical functional surfaces is formed as a mirror surface and thus functions to be reflective.

Furthermore, it is possible that at least one of the optical functional surfaces functions as a diffractive optical element. For example, at least one of the optical functional surfaces comprises a microstructure. The optical functional surface particularly forms a transmissive and reflective grating in this case.

In the method, the optical functional surfaces can be plan or concave or convex or freely-shaped or be formed with a combination of such shapes. According to an advantageous configuration, optical functional surfaces which are not rotationally symmetrical to a common reference axis are produced by means of the method.

The at least one reference surface produced in the method can preferably be formed as a cylinder surface or a plan surface. The reference surface is preferably defined in the same machining coordinate system as the optical functional surfaces. The at least one reference surface generated outside the optical functional surfaces can be used as a reference, measuring, or contact surface for measuring and/or mounting processes of the optical component or further components.

Furthermore, an optical component which can be produced by means of the above-described method is provided. The optical component particularly comprises at least three optical functional surfaces not rotationally symmetrical to a common rotational axis, which are located on at least two different sides of the optical component. Further advantageous configurations of the optical component result from the above description of the method.

The optical component can be a part of an optical device. A position and orientation of the optical component in the optical device is preferably determined by at least one contact surface, which is produced with the optical component, preferably with optical accuracy, and on which the optical component rests in the optical device.

A device for performing a method includes a machine tool for producing the at least three optical functional surfaces and the at least one reference surface, as well as a measuring device for measuring the optical functional surfaces. In an advantageous configuration, the measuring device is integrated in the machining device.

BRIEF DESCRIPTION OF THE DRAWINGS

The method, the optical component producible by means of the method, and a device suitable to perform the method will be explained in greater detail hereinafter by means of exemplary embodiments with reference to the FIGS. 1 to 4.

Like or similar parts are respectively provided with like reference characters. The illustrated components as well as the size relations of the components amongst one another are not to be considered as being true to scale.

DETAILED DESCRIPTION OF ILLUSTRATIVE EMBODIMENTS

Figure 1A:
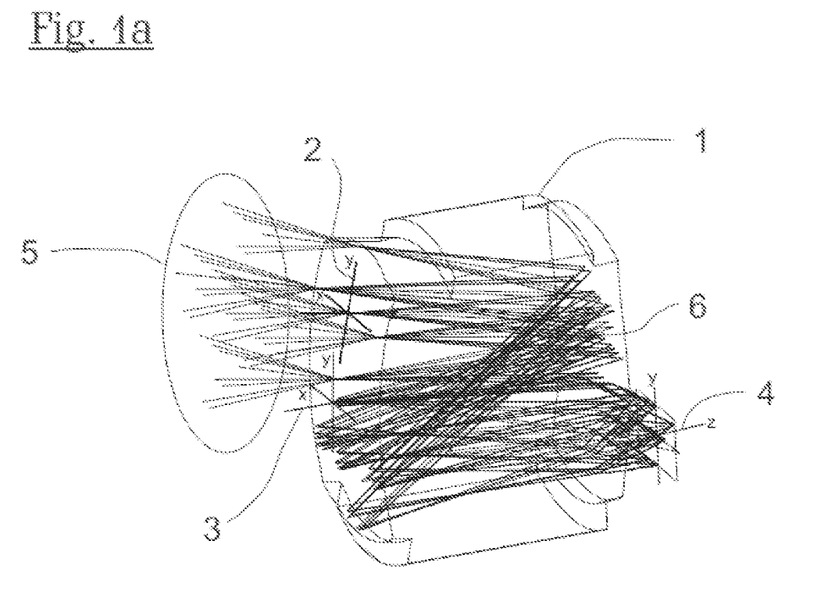
FIG. 1a and FIG. 1b show two views of an optical component with four optical functional surfaces in an exemplary embodiment of the method.
Figure 1B:
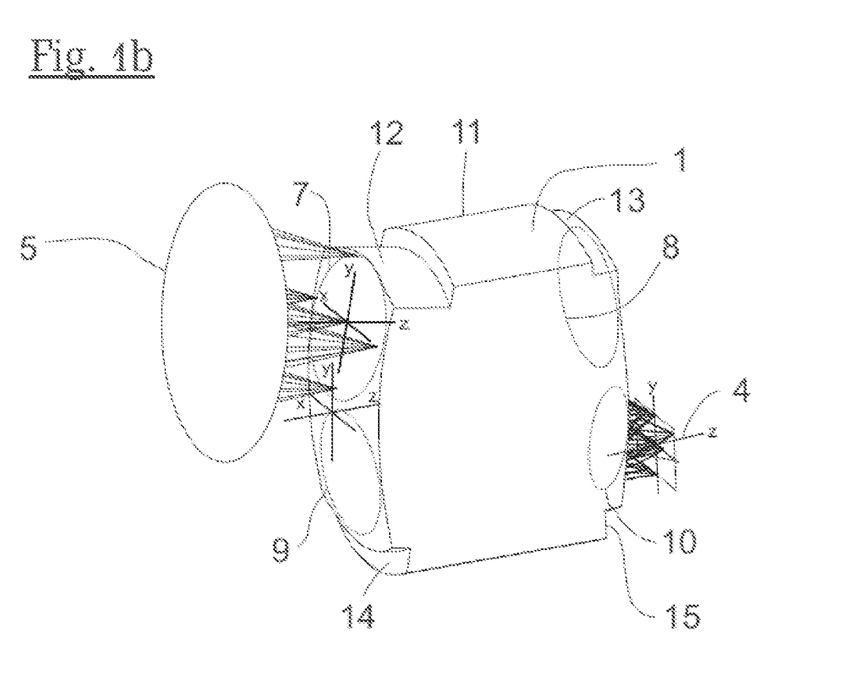

FIGS. 1a and 1b show an exemplary embodiment of an optical component 1, which can be produced by means of the method. FIG. 1a shows, in an isometric view, the optical component 1 with the beam path 6 in the optical component 1. The optical component 1 is an imaging system, which images an image field 5 on to a detector plane 4. For the recording of the image field 5 pictured by the optical component 1, an optical detector can be placed in the image plane 4, for example.

As can be seen in FIG. 1b, the optical component comprises a total of four optical functional surfaces 7, 8, 9, 10. A first optical functional surface 7 and a second optical functional surface 9 are arranged on a first side of the optical component 1. On a second side opposite the first side, the optical component comprises two further optical functional surfaces 8, 10.

The optical functional surfaces 7, 8, 9, 10 can be defined in local coordinate systems, which generally have an orientation that deviates from an input coordinate system 2. In the method, preferably by means of mathematical optimization, at least one machining coordinate system 3 is defined, which is used for the production process. In particular in the case that the optical component is produced as a turned part, the optimization for determining the machining coordinate system 3 can be performed in such a way that all optical functional surfaces 7, 8, 9, and 10 can be machined to a common axis of rotation.

It is advantageous in the method, but not obligatory, that a common machining coordinate system 3 is used for the production of the optical functional surfaces 7, 9 of the first side and the optical functional surfaces 8,10 on the second side of the optical component 1. In fact, the optical functional surfaces on the opposite sides of the optical component can be produced in different machining coordinate systems as well.

In the exemplary embodiment shown in FIGS. 1a and 1b, it is provided to transform the optical functional surfaces 7, 8, 9, 10 defined in local coordinate systems into a common machining coordinate system 3 through coordinate transformation. Generally, the optical functional surfaces 7, 8, 9, 10 do now no longer have any rotational symmetry with respect to a common machining axis, even though the optical basic shape is configured to be rotationally-symmetrically spherically or a-spherically, for example. Rather, after the transformation into the machining coordinate system 3, the height information of the individual optical functional surfaces 7, 8, 9, 10 is now available with high accuracy in the machining coordinate system 3. The producibility of the optical functional surfaces 7, 8, 9, 10, which are now non-symmetrical with respect to the machining coordinate system 3 (hereinafter referred to as "freely shaped" and/or "free shape"), depends on the specific production process and its capability to produce optical surfaces with deviations from a rotationally-symmetrical basic shape.

In a particularly advantageous manner, servo-supported ultra-precision turning methods can be used based upon the use of diamond tools. Thus, for the following explanations, production with diamond machining techniques is assumed, which are known as STS (Slow Tool Servo) or FTS (Fast Tool Servo), for example. However, in the method, other free shape machining methods of ultra-precision machining with diamond tools can be used, such as ultra-precise milling and planing. STS and FTS are special free shape machining techniques of a turning machining, in which an infeed axis (Z axis, see FIG. 2a, 2b) parallel to the machine main spindle is moved synchronously with the spindle in the axial direction to generate a deviation from a rotationally-symmetrical shape defined in the polar direction. Depending on the level of desired asymmetry, this can either be the infeed axis (STS) of the machine itself, or another redundant and additionally mounted linear axis (FTS). The features of the different methods of STS and FTS are per se known to a person skilled in the art and are not explained here in more detail.

Advantageously, at least two of the optical functional surfaces are produced in a common machining step in the method. In the exemplary embodiment of FIG. 1b, on the one hand, the optical functional surfaces 7, 9 are produced on the first side, and on the other hand, the surfaces 8, 10 are produced on the second side, each in one common machining step. A particular advantage of this method is that now, the position of the optical functional surfaces with respect to one another can be set with an accuracy in the range of the production accuracy of one individual optical surface. After the initial machining of a first surface composite, for example of the optical functional surfaces 7, 9 on the first side, the method provides further to also machine the further optical functional surfaces 8, 10 with respect to the first surface composite 7, 9. Advantageously, this occurs through a repositioning of the optical component 1, wherein the optical component is advantageously received on at least one previously produced, high-quality reference surface 11, which serves as a mounting surface.

The repositioning of the optical component is decisively responsible for the quality of the positional allocation between the individual surface composites, which is why the at least one reference surface 11, which serves as a mounting surface, is advantageously also produced by means of ultra-precise diamond machining techniques.

Furthermore, additional defined reference and mounting surfaces can be produced by the same production process on the optical component 1. Corresponding to FIG. 1b, this relates, for example, to cylinder surfaces 12 and 13, which can define the position of potential aperture stops and/or field stops, or further interfaces for the integration of the optical component 1 in a next higher system level, for example. Furthermore, axial stop surfaces 14 and 15 can be produced, for example, which have an exact relation to the machining coordinate system 3 and the optical functional surfaces 7, 8, 9, 10.

Figure 2A:
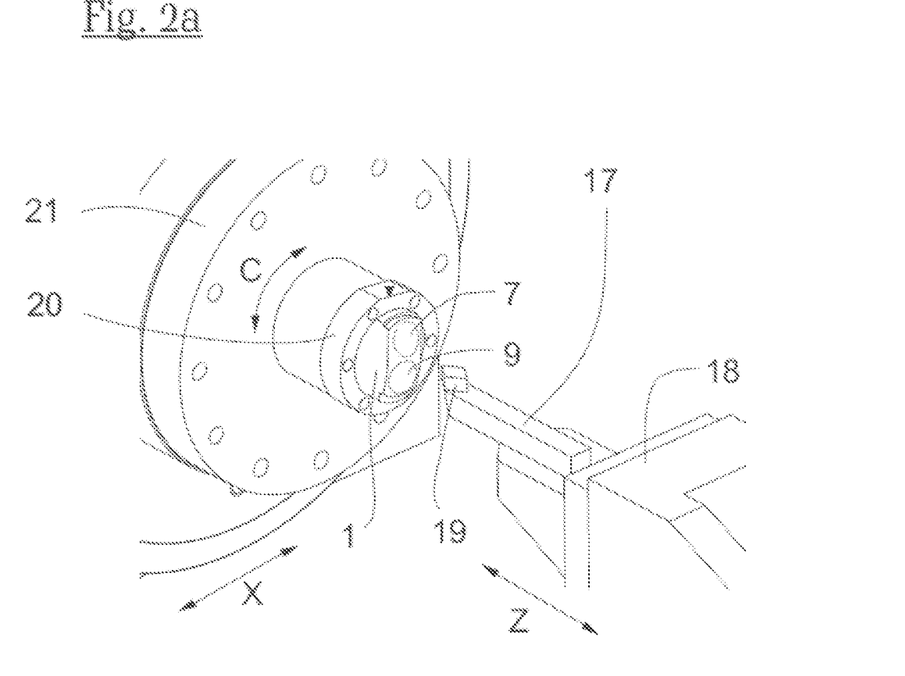
FIG. 2a and FIG. 2b show the optical component on a device suitable for performing the method.
Figure 2B:
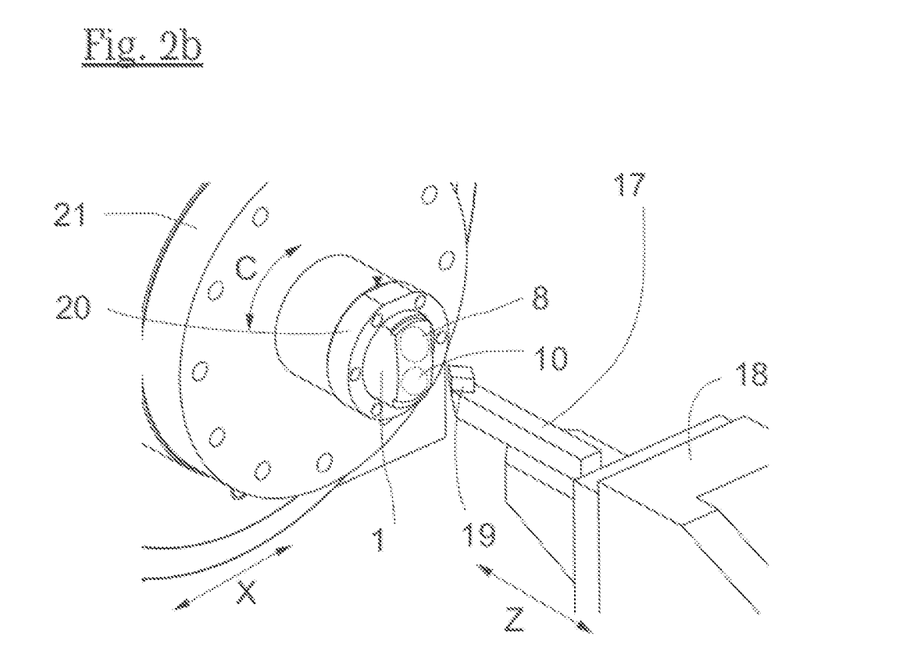

FIGS. 2a and 2b show an exemplary embodiment of a device for producing the optical component 1 illustrated in FIGS. 1a and 1b. To that end, the optical component 1 is received on a machine tool 21 via a mount 20. By way of example, the machine tool 21 is represented with two linear movement axes X, Z and one rotational axis C. First, the optical component 1 is mounted on the machine tool 21 in such a way that a machining of the optical functional surfaces 7 and 9 by a turning chisel 19, mounted on the tool holder 17 and an associated receiving device 18, is enabled.

Typically, the position of the tool 19 with respect to the main spindle axis C of the machine tool 21 is known exactly following a setup process, so that measurements as well as referencing of workpiece and tool can be transformed into the machine coordinate system of the machine tool 21. In the method, the turning chisel 19 now machines the two optical functional surfaces 7, 9 in a first machining step in one single micro-machining turning process. In addition, at least one or multiple mounting and reference surfaces 11, 12, 13, 14, 15 corresponding to FIGS. 1a and 1b can be produced by the same turning tool 19 or by an additional turning or milling tool, which is preferably integrated in the machine tool 21.

After the machining of the first surface composite including the optical functional surfaces 7, 9, the optical component 1 is repositioned in such a way that the second side of the optical component can be machined. In the exemplary embodiment, the optical component is re-clamped to that end, by releasing it from the holder 20 and mounting it in such a way that now, the optical functional surfaces 8, 10 face the tool 19 for the following second machining step (FIG. 2b). The re-clamping is effected by reference surfaces, which preferably were also produced by ultra-precision machining and the surface quality and measurements of which are known. The alignment and referencing of the component in the machine tool 21 is effected for the second surface composite 8, 10 advantageously similar to the referencing of the surfaces 7, 9, in particular by means of at least one of the reference surfaces 11, 12, 13, 14, 15 produced in the first production step, e.g., cylinder surfaces. After the referencing, the optical functional surfaces 8, 10 are machined on the second side of the optical component 1 by the machining tool 19 in a common machining step.

Through the machining in one common production process and the exact repositioning of the optical component 1 using at least one reference surface, 11, 12, 13, 14, 15, all four optical functional surfaces 7, 8, 9, 10 of the exemplary embodiment can be produced with high accuracy in shape and position. This particularly relates to lateral decentering and axial distances of the surfaces (so-called "center thickness" of the component) as well as angular relations and shape accuracies of the optical functional surfaces 7, 8, 9, 10.

For the machining of in each case at least two optical functional surfaces in one common machining step, the machine tool 21 used may require information for the infeed position of the used linear and rotational axes on a uniform raster, however at least in adequately small grid distances, for the generation of a uniform movement of the machining tool 19. In the method, the height information of the individual optical functional surfaces 7, 8, 9, 10 to be machined is preferably present with high accuracy in their local coordinate systems. The exact surface definition often follows typical description types in optical designing, such as spherical and conical surfaces, polynomial systems or spline descriptions. After the definition of one (or multiple) machining coordinate systems 3, the height information of the optical functional surfaces 7, 8, 9, 10 can be transformed into a common machining coordinate system with high accuracy, but the information of the surface descriptions still only concerns the regions of the individual free apertures of the optical functional surfaces or potential edge regions. Here, the shapes of the apertures can be circular, oval, rectangular, hexagonal or even any shape.

In the method, the regions between the optical functional surfaces are advantageously interpolated and made continuous by a mathematical calculation to generate a contiguous surface composite, which, in the apertures of the individual optical functional surfaces, corresponds exactly to the original height information however. Making the individual optical functional surfaces continuous to form a surface composite typically involves the local slopes and curvatures. The connection conditions to the original surface geometries must ensure minimal inclinations and accelerations, in order to generate surfaces as homogenous as possible with little micro-roughness in the micro-machining machining. An advantageous configuration of the method provides using the generated surface composite both as a basis for the mechanical design of the optical component, for example as a CAD surface, and for the machining.

Figure 3A:
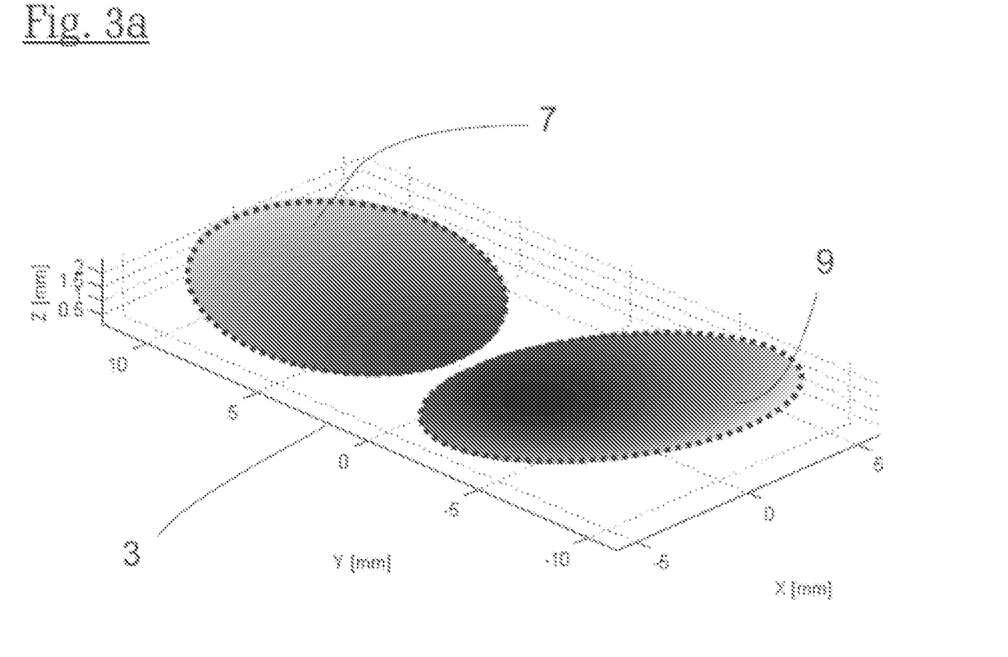
FIG. 3a and FIG. 3b show an exemplary illustration of a surface composite of two optical functional surfaces in an exemplary embodiment of the method.
Figure 3B:
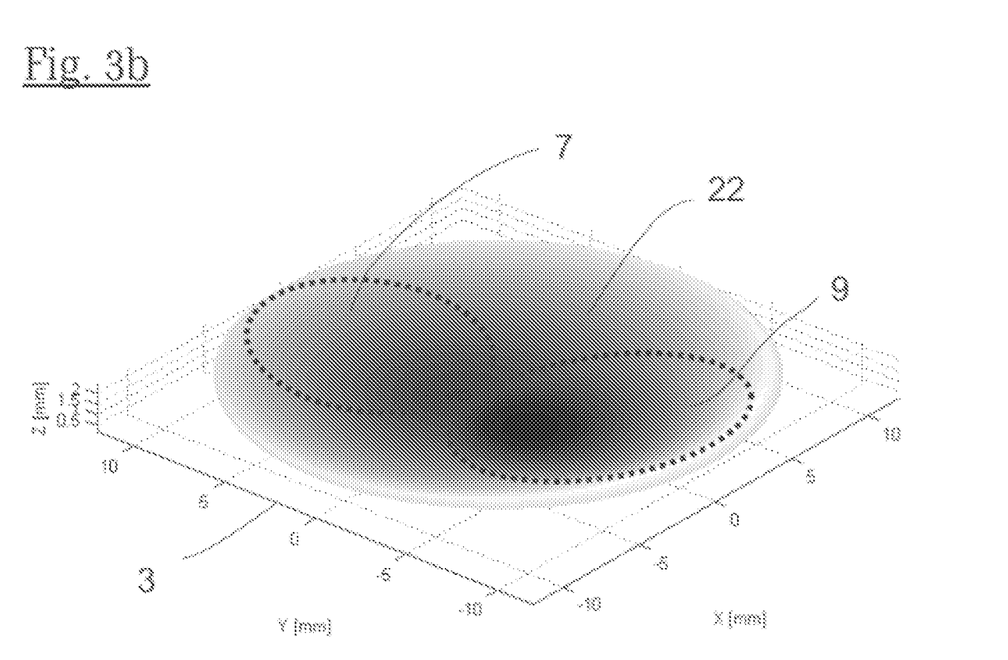

By way of example, FIGS. 3a and 3b show details for generating a surface composite 22 from the individual optical functional surfaces 7, 9. To that end, FIG. 3a shows the optical functional surfaces 7, 9 of the optical component 1 represented in FIGS. 1a and 1b in a common machining coordinate system 3. With respect to the respective original coordinate systems of the optical functional surfaces 7, 9, both optical functional surfaces 7, 9 were transformed into the machining coordinate system 3 by means of a coordinate transformation. As shown in FIG. 3b, now, a common rotationally-symmetric basic shape can be found, which minimizes the remaining differences between the height information of the individual surfaces and the common rotationally-symmetrical basic shape by means of an optimization instruction. The remaining non-rotationally symmetrical portion (referred to as "free shape portion" in the following) particularly determines the spindle-synchronous infeed of the FTS or STS turning tool in the production method. Now, the available height information is interpolated in the regions between the optical functional surfaces 7, 9 and, advantageously, added to the rotationally-symmetrical basic shape on a regular grid. A surface composite 22 results, which is now completely defined via the machining region of interest and, in the regions of the optical functional surfaces 7, 9, contains the unchanged height information for the production of these surfaces in the machining coordinate system.

In the further course of the method, the generated surface composites 7, 9, and 8, 10 are being measured in shape and positional relation by a suitable, high-resolution measuring technique. Here, measuring can be effected by means of known methods in optical metrology, such as interferometry, deflectometry, or a tactile measuring method. In the measuring processes, shape and positional deviations of the surface composites 7, 9 and 8, 10 from the desired values can be determined in an advantageous manner. The determined deviations serve as a basis for the generation of a corrective machining. To that end, in the method, the optical component 1 advantageously is received and set-up again and in a reproducible manner on the machine tool 21. In further micro-machining machining steps, now, the optical functional surfaces 7, 9 and 8, 10 are machined to the desired geometry in accordance with the determined deviation. If required, an iterative loop of measuring and machining cycles can be looped, until the obtained deviation falls below a predetermined tolerance value.

In the event that an advantageously high-resolution measuring technique is used, which enables measuring the relative position of two opposite surface composites and thus of the "center thickness" of the optical component, not only a correction of the shape and position of multiple individual surfaces on a common surface composite can be effected, but also the correction of the relative position of multiple surface composites with respect to one another.

Figure 4A:
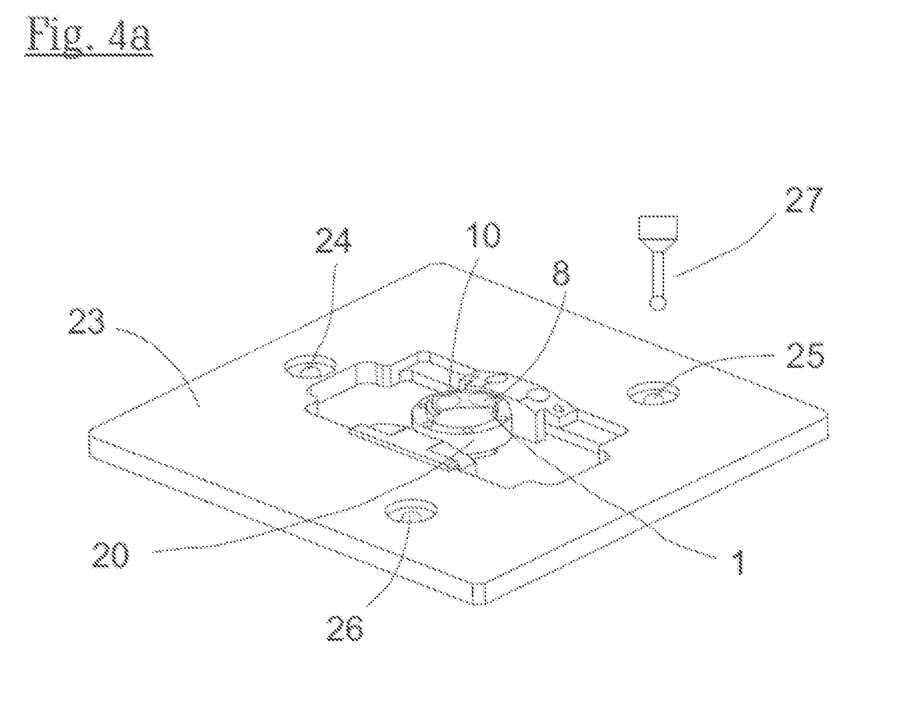
FIG. 4a and FIG. 4b show a measuring setup for detecting the positional and shape deviations of the optical functional surfaces and reference surfaces in an exemplary embodiment of the method.
Figure 4B:
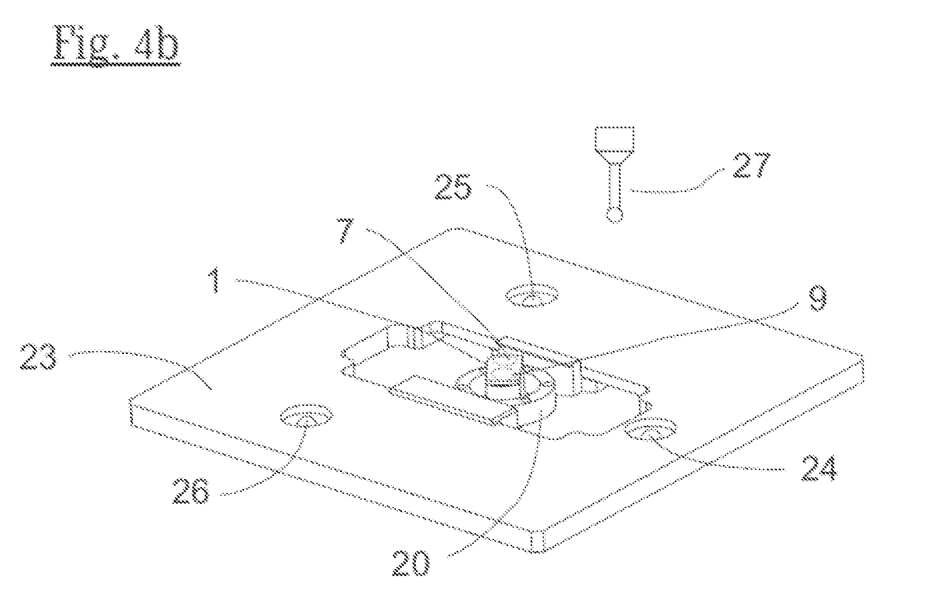

By way of example, FIGS. 4a and 4b show the measuring of the optical component 1 with a preferably high-resolution, tactile-punctual or scanning measuring device 27. The optical component 1 is received in a measuring mount 23 during the measurement, which has reference elements 25, 25, 26 that can be measured from both sides. The reference elements 24, 25, 26 are fixedly mounted to the frame of the measuring mount 23 and, in an advantageous configuration, consist of standard balls, which can be produced from ceramics with a precise and known diameter, for example. The measuring mount 23 is configured in such a way that the optical component 1 to be measured can be detected by the measuring device 27 completely on both sides. Now, to determine the shape and positional error of the two surface composites 7, 9 and 8, 10, in a first measuring step, first the optical component 1 is measured, by the measuring device 27, on the side of the optical functional surfaces 8, 10 in a tactile manner. The positions of the external reference elements 24, 25, 26 integrated in the measuring mount 23 are also simultaneously determined (FIG. 4a).

After the measurement, the measuring mount 23 is rotated manually or automatically in such a way that now, the second surface composite consisting of the optical functional surfaces 7, 9 faces the measuring device 27. During the rotation, it must be ensured by the measuring mount 23 that the received optical component 1 does not experience any relative positional change, since this would be interpreted as a shape and/or positional error later on. After the rotation of the measuring mount 23, now, the second side of the monolithic optical component 1 is measured by the measuring device 27 in a tactile manner and again with reference to the external reference elements 24, 25, 26.

An exemplary configuration variant of the evaluation of surface information measured in a tactile manner is explained now in greater detail. After completing both measuring cycles, measuring information on the two opposite surface composites including the four optical functional surfaces 7, 8, 9, 10 as well as the positions of the external reference elements 24, 25, 26 are known from both measuring cycles. The data of the optical functional surfaces is typically available as point clouds in the coordinate system of the measuring device 27. Now, by means of various transformations and optimizations, it is possible to find an instruction that transforms the measured point clouds of the opposite surface composites into a new coordinate system, in which a minimal deviation of the first measured optical functional surfaces 8, 10 from their desired shape and position exists (so-called "best fit" set-up). The instruction found consists of a general rotation matrix, which has optimized parameters and is applied to the three-dimensional measuring points. After the transformation of the measuring points, the position of the reference elements 24, 25, 26 in the transformed coordinate system is also known. Now, in the second calculation step, the measuring data of the second measuring step including the optical functional surfaces 7, 9 is transformed in such a way that the difference between the measured positions of the reference elements 24, 25, 26 is minimized. Now, both measured point clouds are present in one common coordinate system, wherein an allocation of the second surface composite 8, 10 to the first surface composite 7, 9 exists with high accuracy. Potential errors in shape and position of the surface composites with respect to one another can be evaluated in this way.

The metrological testing of the surfaces of the optical component does not necessarily have to occur with respect to externally mounted reference elements 24, 25, and 26. In the case that the material to be machined of the optical component 1 allows a micro-machining machining, for example, reference elements that can be measured by a suitable production process can be produced at the component itself, which serve as references for the following measuring process, allowing an exact detection of the shape and positional errors. In the case that reference elements are formed directly on the optical component 1, a mount in a special measuring mount 23 with external reference elements 24, 25, 26 can be omitted.

The invention is not limited by the description by means of the exemplary embodiments. The invention rather includes every new feature as well as any combination of features, which particularly includes any combination of features in the claims, even though this feature or this combination is itself not explicitly indicated in the claims or exemplary embodiments.

The invention claimed is:

1. A method for producing an optical component having at least three monolithically arranged optical functional surfaces, wherein the optical functional surfaces comprise a first and a second optical functional surface on a first side of the optical component and at least one third optical functional surface on a second side of the optical component, the method comprising:
   A) calculating a continuous surface composite, which includes the first optical functional surface and the second optical functional surface;
   B) producing the continuous surface composite, which contains the first and second optical functional surfaces in a defined shape and a relative position to one another, on the first side of the optical component through machining by a machine tool;
   C) producing at least one reference surface arranged outside the optical functional surfaces on the optical component or on a mount and having a defined positional relation to the optical functional surfaces through machining by the machine tool;
   D) repositioning the optical component in such a way that the second side of the optical component is machined with the machine tool, wherein the at least one reference surface serves as a contact surface or mounting surface;
   E) producing the at least one third optical functional surface on the second side of the optical component in a defined shape and a defined relative position to the optical functional surfaces produced in a first machining step through machining with the machine tool;
   F) measuring the shape and position of the at least three monolithically arranged optical functional surfaces in a measuring setup, wherein information about deviations of the optical functional surfaces from their desired shapes and positions is obtained; and
   G) repeating the steps of machining the first and second optical functional surfaces, repositioning the optical component and machining the at least one third optical functional surface, wherein the information about the deviations of the optical functional surfaces from their desired shapes and positions is used to perform a corrective machining of the optical functional surfaces to minimize determined shape and position errors with the machine tool.

2. The method according to claim 1, wherein the steps F) and G) are repeated multiple times until the deviations of the optical functional surfaces from their desired shapes and positions fall below a predetermined tolerance.

3. The method according to claim 1, wherein machining by the machine tool in at least one of the steps B), C), E) or G) is performed at least partially by a turning tool of the machine tool.

4. The method according to claim 1, wherein machining by the machine tool in at least one of the steps B), C), E) or G) is performed at least partially by a milling tool or a planing tool of the machine tool.

5. The method according to claim 1, wherein machining by the machine tool in at least one of the steps B), C), G) or E) is performed by successive or alternating use of a turning tool, a milling tool or a planing tool of the machine tool.

6. The method according to claim 1, wherein machining by the machine tool in at least one of the steps B), C), G) or E) is performed at least partially by a grinding tool and/or a polishing tool.

7. The method according to claim 1, wherein at least two of the optical functional surfaces are transmissive optical surfaces.

8. The method according to claim 1, wherein at least one of the optical functional surfaces is a mirror surface.

9. The method according to claim 1, wherein at least one of the optical functional surfaces comprises a microstructure, and wherein the optical functional surface is a transmissive grating or a reflective grating.

10. The method according to claim 1, wherein the optical functional surfaces are non-rotationally-symmetrical to a common reference axis.

11. The method according to claim 1, wherein the at least one reference surface is formed as a cylinder surface or a flat surface.

12. The optical component produced according to the method of claim 1.

13. An optical device comprising:
the optical component according to claim 12.

14. The optical device according to claim 13, wherein a position and an orientation of the optical component in the optical device is determined by at least one contact surface, which is produced with the optical component and on which the optical component rests in the optical device.

15. A device for performing the method according to claim 1, the device comprising:
   the machine tool configured to produce the at least three optical functional surfaces and the at least one reference surface; and
   a measuring device configured to measure the optical functional surfaces.

16. A method for producing an optical component having at least three monolithically arranged optical functional surfaces, the method comprising:
   calculating a continuous surface composite, which includes a first optical functional surface and a second optical functional surface;
   producing a continuous surface composite, which contains the first and second optical functional surfaces in a defined shape and a relative position to one another, on a first side of the optical component through machining by a machine tool;
   providing at least one reference surface arranged outside the optical functional surfaces on the optical component or on a mount and having a defined positional relation to the optical functional surfaces through machining by the machine tool;

repositioning the optical component in such a way that a second side of the optical component is machined with the machine tool, wherein the at least one reference surface serves as a contact surface or mounting surface;

producing the at least one third optical functional surface on the second side of the optical component in a defined shape and a defined relative position to the optical functional surfaces produced in a first machining step through machining with the machine tool;

measuring the shape and position of the at least three monolithically arranged optical functional surfaces in a measuring setup, wherein information about deviations of the optical functional surfaces from their desired shapes and positions is obtained; and repeating machining the first and second optical functional surfaces, repositioning the optical component and machining the at least one third optical functional surface, wherein the information about the deviations of the optical functional surfaces from their desired shapes and positions is used to perform a corrective machining of the optical functional surfaces to minimize determined shape and position deviations with the machine tool.

* * * * *